Patented Sept. 7, 1943

2,328,681

UNITED STATES PATENT OFFICE 2,328,681

POLYMERIZATION OF ROSIN AND ROSIN ESTERS

Alfred L. Rummelsburg, Wilmington, Del., assignor to Hercules Powder Company, Wilmington, Del., a corporation of Delaware No Drawing. Application June 21, 1940, Serial No. 341,638

12 Claims. (Cl. 260—97)

This invention relates to a method for the polymerization of rosin, rosin esters, and mixtures thereof.

Rosin has heretofore been treated with sulfuric acid to remove the color bodies therefrom for the production of a light colored rosin, and to increase the melting point of the rosin by polymerization. Thus, U. S. Patents No. 915,401 and No. 915,402 to Yaryan disclose a process for the refining of rosin, in which a solution of rosin in a petroleum hydrocarbon solvent is treated with sulfuric acid. Such treatment causes the color bodies of the rosin to become insoluble in the petroleum hydrocarbon solvent and be precipitated from the solution of refined rosin. U. S. Patent No. 2,017,866 to Morton discloses a process by which a gasoline solution of rosin is treated with sulfuric acid under limited and specific conditions to polymerize rosin and thereby increase its melting point. U. S. Patent to Rummelsburg 2,108,928 discloses benzene as the solvent in the polymerization of rosin.

In the following description where the term rosin is used, it is to be understood that either rosin, esters thereof, or a mixture of rosin and an ester thereof, is contemplated.

I have found that the polymerization of rosin by treatment with sulfuric acid proceeds with high efficiency when rosin is dissolved in a hydrogenated cyclic hydrocarbon which is stable to sulfuric acid under the conditions of treatment. This process proceeds with greater efficiency than the prior art processes using gasoline as a solvent and is productible of a product of a polymerized rosin of a paler color for a given increase in melting point. It is also effective in producing a product of low acid number in a very short period of reaction when such is desired.

The method in accordance with my invention consists essentially of treating a hydrogenated cyclic hydrocarbon solution of rosin with sulfuric acid. After this treatment my process may be completed in either of two ways. The entire reaction mixture may be agitated with water to remove the sulfuric acid and cause the precipitated polymerized rosin-sulfuric acid association product containing rosin color bodies and some unpolymerized rosin to redissolve the water separated from the polymerized rosin solution, and then the polymerized rosin recovered from its solution by the evaporation of the solvent. In following this procedure the color bodies of the rosin are not separated from the rosin. Alternately, the precipitated polymerized rosin-sulfuric acid association product containing some unpolymerized rosin and the color bodies originally in the rosin and those formed by the polymerization may be separated from the reaction mixture, the reaction mixture treated to remove the sulfuric acid, and then the polymerized rosin recovered from its solution by evaporation of the solvent. In following this alternative procedure, a substantial portion of the color bodies is removed from the rosin, so that a rosin of lighter color is produced than when the color bodies are redissolved.

The rosin treated by the method in accordance with my invention may be any of the various grades of wood or gum rosin. The rosin treated may be heat treated, distilled, or refined by any of the processes known to the art. When treating wood rosin, I prefer to use a wood rosin which has been subjected to a refining operation for the removal of color bodies, although unrefined wood rosin may, if desired, be treated by my process. Thus for example, a wood rosin having a color grade of I (U. S. Standard rosin types) is entirely satisfactory. Any of the usual grades of gum rosin are well adapted for treatment by my process.

More particularly, the method in accordance with this invention involves the treatment of rosin in solution in a hydrogenated cyclic hydrocarbon solvent, such as, for example, decahydronaphthalene (decalin); cyclohexane; alkylated cyclohexanes, as methyl cyclohexane, ethyl cyclohexane, propyl cyclohexane, isopropyl cyclohexane, butyl cyclohexane, the menthanes comprising o-methyl isopropyl cyclohexane, m-methyl isopropyl cyclohexane, p-methyl isopropyl cyclohexane, dimethyl cyclohexane, trimethyl cyclohexane (hexahydromesitylene); arylated cyclohexane such as cyclohexylbenzene; alkylated decahydronaphthalene, such as the methyl, ethyl, propyl, butyl and amyl derivatives thereof, hydrogenated diphenyl (undecahydrodiphenyl); cyclopentane and alkylated derivatives thereof; bicyclo hydrocarbons such as bicyclopentane, etc.; and other saturated alicyclic hydrocarbons comprising one or more saturated five- or six-membered carbon rings, whether the rings be directly bonded as in bicyclohexane and decahydronaphthalene, or separated as in hexahydrobenzylcyclohexane, the solvent employed preferably being in liquid form and exhibiting limited volatility under the conditions of treatment and being inert to sulfuric acid, with sulfuric acid of a concentration within the range of about 65% to about 102% by weight and preferably within the range of about 85% to about 100% by weight and in amount within the range of about 0.1% to about 100% by weight and preferably within the range of about 5% to about 50% by weight, on the basis of the rosin content, with vigorous agitation; at a temperature within the range of —10° C. to about 65° C. and preferably within the range of about 10° C. to about 30° C. and for a period of time varying from the time required to add the sulfuric acid to the rosin solution to about eight hours or more.

In following the embodiment of my invention in which the color bodies are allowed to remain in the rosin, after the sulfuric acid has reacted with the solution of rosin for the desired period of time, the reaction mixture is washed with hot or cold water, or aqueous solutions of salts, or dilute aqueous solutions of alkali, as may be desired, to remove the sulfuric acid and cause the precipitated color bodies to go back into solution. The amount of water or aqueous solution used to wash the reaction mixture may vary from a weight equal to the weight of sulfuric acid present to ten times that amount or more. The use of an aqueous solution of electrolyte is desirable when the solution of rosin shows a tendency to emulsify in the wash water. Inorganic salts, such, for example, alkali chlorides, sulfates, borates, phosphates, alkaline earth halides, aluminum halides, etc., may be added to the wash water in concentrations varying from very dilute to saturated, and the wash water may be at any temperature within the range of 0° C. to 100° C. In general, it will be found that concentrations of salt within the range of about 0.5% to about 10% by weight of the water are satisfactory. Dilute solutions of alkalies, such as, sodium hydroxide, ammonium hydroxide, ammonium carbonate, sodium carbonate, etc., and organic bases, such as triethanolamine, etc., are very efficient in removing sulfuric acid from the rosin solution, but care is necessary in their use to avoid reaction with the rosin. The concentration of alkali may vary from about 0.1% to about 10% by weight. Ammonium hydroxide or ammonium carbonate is preferable for the purpose, since any ammonium salt of the rosin which may be formed can easily be decomposed by heat. After the reaction mixture has been washed to decompose the sludge and put back into solution, the polymerized rosin is recovered from its solution by the evaporation of the solvent.

In following the alternate embodiment of my invention in which the precipitated polymerized rosin-sulfuric acid association product containing the rosin color bodies is partially removed from the rosin after the sulfuric acid has reacted with the solution of rosin for the desired period of time, the precipitate which has formed may be conveniently removed from the reaction mixture by centrifuging, or by allowing it to settle and then separating it from the reaction mixture by decantation. The time required for the precipitated sludge to settle depends upon a number of factors, such as, for example, the size of the charge, the viscosity of the rosin solution, etc., and may vary from several minutes to several hours. The separation by centrifuging will be much more rapid. Following the removal of the precipitated sludge, the reaction mixture may be treated in either of two ways. The reaction mixture may, if desired, be washed with hot or cold water, or hot or cold solutions of salts, such as, for example, alkali salts of chlorides, sulfates, phosphates, borates, etc., or dilute alkali solutions, to remove the sulfuric acid. The conditions for washing will be the same as those described hereinbefore for washing the reaction mixture to decompose the precipitated sludge. After the polymerized rosin or rosin ester solution is washed free of sulfuric acid, the polymerized rosin or rosin ester will be recovered by evaporating the solvent, preferably, at reduced pressure.

If desired, the reaction mixture after the decantation of the precipitate may be treated with an absorbent such as activated carbon, acid-activated clay, fuller's earth, fibrous asbestos, etc. in order to remove the last traces of the color bodies. The amount of absorbent used may vary widely and will depend upon the difficulty and the degree of refinement desired, and on the method of operation used. The absorbent material may be contacted with the rosin solution by agitation of the absorbent in the rosin solution or by running the rosin solution through a bed of the absorbent material. After treatment of the reaction mixture with the absorbent material, and the complete removal of the absorbent material therefrom, as by filtration or centrifuging, the reaction mixture is washed to free it from sulfuric acid as described hereinbefore, and polymerized rosin recovered from the remaining solution by evaporation of the hydrogenated cyclic hydrocarbon.

In following the alternative embodiment of my invention in which the precipitate containing the polymerized rosin-sulfuric acid association product, color bodies originally in the rosin and color bodies produced by the polymerization reaction, is separated from the hydrogenated cyclic hydrocarbon solution of rosin following the sulfuric acid treatment, a dark colored polymerized rosin can be recovered from the precipitate by extracting the separated precipitate in a suitable water-immiscible solvent therefor, washing the solution free of sulfuric acid with water, aqueous salt solutions or dilute aqueous alkali solutions, and then recovering a dark colored polymerized rosin from this solution by evaporating the solvent. Suitable solvents for the precipitate are halogenated hydrocarbons, such as, for example, ethylene dichloride, carbon tetrachloride, chlorobenzene, etc.; ethers, such as, for example, diethyl ether, isopropyl ether, dichloro ethyl ether; aromatic hydrocarbons, such as, for example, benzol, toluol, xylol, alkylated benzols, etc.

The precipitated material separated from the solution may likewise be treated with a water miscible solvent such as ethyl alcohol and acetone, and the solution treated with water to precipitate a dark colored mixture of polymerized and unpolymerized rosin. The precipitate may be separated, washed, dried, and melted to recover a dark color polymerized rosin.

The precipitated material may likewise be treated wtih a solution of rosin dissolved in a suitable solvent, preferably water-immiscible, such as, for example, benzol, xylol, ethylene dichloride, ether, etc., and the solution then treated to remove sulfuric acid, and the mixture of polymerized and unpolymerized rosin then recovered by the removal of solvent.

A dark colored polymerized rosin may, likewise, be recovered from the precipitate of polymerized rosin association product and color bodies by adding the sludge to an excess of water with cooling and agitation. After the removal of the sulfuric acid the precipitate will dissolve in a hydrogenated cyclic hydrocarbon solvent which has been occluded from the rosin solution, to form a viscous solution of dark colored polymerized rosin in the hydrogenated cyclic hydrocarbon. This solution may be washed free of sulfuric acid with water, aqueous salt solution or dilute aqueous alkali solution, or it may be diluted with additional hydrogenated cyclic hydrocarbon, or with any other rosin solvent, and then washed free of sulfuric acid. Due to the difficulty of washing a very viscous rosin solution, the latter course is preferable.

The above described alternative procedures made possible the removal of all the precipitated material or putting all of it back into solution. Intermediate procedures may be followed in which a part of the precipitated material is put back into solution by treatment with a limited amount of water, or by treatment with an excess of water for a limited time. In general, the color of the polymerized rosin will decrease as the amount of precipitated material put back into solution is decreased and, conversely, the increase in the melting point of the rosin becomes greater. The proportion of the precipitated material which is redissolved will depend on the amount of water added, or if an excess of water is added, by the time for which the water is allowed to remain in contact with the sludge. The amount of water can be more accurately controlled than the time of contact.

The concentration of rosin in the hydrogenated cyclic hydrocarbon solution of rosin treated with sulfuric acid in this method may vary over a range of about 10% to about 70% by weight, and preferably within the range of about 20% to about 50% by weight. Lower concentrations of rosin in the solution favor the production of the lightest colored products, at the expense of the increase secured in the melting point of the rosin. High concentrations favor the production of the greatest increase in the melting point of rosin in the shortest reaction period and with the use of minimum amounts of sulfuric acid. Likewise, high concentrations favor maximum reductions in the unsaturation of the rosin in the shortest reaction time.

The concentration of sulfuric acid used in the treatment of the rosin solution can vary over the range of about 65% to about 102% and preferably within the range of about 85% to about 100%. The exact concentration used will be selected on the basis of the desired product and the selection of the other variables of the reaction. I have found that sulfuric acid of a concentration within the range of about 89% to about 97% is convenient to use. The amount of sulfuric acid used in the reaction mixture may be varied over a wide range. Thus, amounts of sulfuric acid used may vary within the range of about 5% to 50% based on the weight of the rosin present. In general, it will be found desirable to use an amount of sulfuric acid within the range of about 15% to about 40% based on the rosin present.

The temperature at which the reaction will desirably be conducted is from about −10° C. to about 65° C. Below −10° C. the rate of reaction becomes slow, requiring long reaction periods to produce any appreciable increase in the melting point of the rosin, while above 65° C. the reaction conditions are severe, so that the rosin is darkened in color during the reaction, with the result that any improvement in color secured, for example, by the removal of color bodies in the sulfuric acid precipitate is lost. My preferred temperature range is from about 10° C. to about 30° C.

The length of time the reaction is allowed to continue will depend on the extent to which it is desired to increase the melting point of the rosin, the desired color of the product, and upon the conditions under which the reaction is being run. Thus, to secure any given increase in the melting point of the rosin being treated, the time of reaction will depend largely upon the temperature of the reaction mixture, the concentration of rosin in the rosin solution, and the amount and concentration of sulfuric acid present. The addition of the sulfuric acid usually requires from about ten minutes to about thirty minutes, depending on the size and shape of vessel, efficiency of cooling, etc., if an excessive temperature rise is to be avoided. If desired the sulfuric acid may be sprayed into the reaction mixture, thus favoring uniform contract. The reaction may be stopped at that point or allowed to continue 8 hours or more, although I have found that an additional period of time within the range of 1 to 3 hours after the addition of the sulfuric acid is usually sufficient. A reaction period of more than about 3 hours usually results in an undue darkening of the product, and for that reason is desirably avoided.

The efficiency of agitation of the reaction mixture during the sulfuric acid treatment is a factor of paramount importance in obtaining the maximum increase in the melting point of rosin under any given set of conditions. It will be found that the more efficient the agitation, the greater will be the increase in the melting point of the rosin. Under a given set of reaction conditions the efficiency of agitation may make a difference of 5° C., or more, in the melting point of the product.

The properties of rosin treated by the method of this invention will depend upon the properties of the original rosin and the exact conditions of treatment. It will be found that the melting point of rosin will show the greatest increase when treated by the procedure in which the color body sludge is put back into the rosin solution and, hence, no color bodies removed from the rosin. A rosin treated by this procedure will be found to have its melting point, as determined by the drop method, increased from about 12° C. to about 50° C., its unsaturation decreased, its color somewhat darkened, and its acidity either unchanged or somewhat reduced. When rosin is treated by the alternative procedure in which precipitated material is removed from the rosin solution, a somewhat smaller increase is made in the melting point of the rosin, the product is lighter in color, and usually has a higher acid number.

The product of this method consists of a mixture of polymerized rosin or its esters, unpolymerized rosin or its esters, unsaponifiable matter, and small amounts of rosin oils which may be formed by the action of the sulfuric acid. If desired, the product may be freed from any rosin oils which may have been formed, by reduced pressure distillation, thereby greatly improving the product by removing any tackiness which may be produced by such oils. I have found that a polymerized wood rosin, from which the rosin oils and unpolymerized material have been removed, will have a melting point within the range of 170° to 180° C., and to have a molecular weight as determined by the Rast method of approximately twice that of unpolymerized rosin.

It will be appreciated that the melting points given above and those given hereinafter were obtained by the A. S. T. M. method for determining drop melting points, and it should be noted that this method must be followed exactly to obtain accurate and comparable results.

Practical embodiments of the method in accordance with this invention, and the properties of the polymerized products produced thereby, are illustrated by the examples which follow.

EXAMPLE I

To a solution of 250 parts by weight of I wood rosin dissolved in 580 parts by weight of decahydronaphthalene was added 63 parts by weight of sulfuric acid of 95% strength, with agitation during a 20 minute period at about 15° C. The solution was then agitated at about 18° C. for 1¼ hours. After standing for about 4 minutes, the solution was separated from the sludge present by decantation and washed with warm water until free of the sulfuric acid. The decahydronaphthalene was then evaporated to leave as a residue a 75% yield of a polymerized rosin having the characteristics shown in comparison with those of the original untreated rosin in the following:

|  | Treated rosin | Original I wood rosin |
|---|---|---|
| Acid number | 150 | 163 |
| Melting point °C | 103 | 80 |
| Color | M | I |
| Thiocyanate value | 65 | 85 |

The sludge was extracted with ether, the extract washed with water until free of sulfuric acid, and the ether evaporated to leave as a residue a yield of 23% of a dark colored polymerised rosin having the following characteristics:

Acid number _____ 113
Melting point _____°C__ 124

EXAMPLE II

The procedure given in Example I was followed, with the exception that after the sulfuric acid was added the temperature was raised to about 28° C. The characteristics of the pale polymerized rosin produced, as compared with those of the original I wood rosin, were as follows:

|  | Treated rosin | Original I wood rosin |
|---|---|---|
| Acid number | 145 | 163 |
| Melting point °C | 97 | 80 |
| Color | I | I |

EXAMPLE III

To a solution of 250 parts by weight of I wood rosin in 580 parts by weight of cyclohexane were added with agitation 63 parts by weight of 95% strength sulfuric acid during a 15 minute period at about 15° C. Following the addition of the sulfuric acid, the reaction mixture was agitated for 1¼ hours at about 15–18° C. The solution was then allowed to stand for 3 minutes, then decanted from the sludge present, washed with warm water until the sulfuric acid had been removed, and the solvent evaporated at reduced pressure, to leave as a residue a 79% yield of a material having the following characteristics:

Acid number _____ 170
Melting point _____°C__ 85–87
Color _____ WG

EXAMPLE IV

There was prepared a solution of 100 g. WG gum rosin in 75 c. c. of cyclohexane. To the solution was added, with agitation, a solution of 63 c. c. of 95% H$_2$SO$_4$ in 26 c. c. of water. The solution of sulfuric acid was added with agitation over a period of 20 minutes. The acid solution was at a temperature of 30–32° C., while the rosin solution was at room temperature. The mixture was then agitated for 1½ hours at 30–32° C. The reaction mixture was then added to 250 c. c. of cyclohexane and vigorously shaken. The solution was decanted from the sludge, water-washed, and the solvent distilled off under vacuo. The product had the following characteristics as compared with those of the original rosin:

|  | Polymerized rosin | Original rosin |
|---|---|---|
| Acid number | 139.5 | 166 |
| Drop melting point °C | 119 | 81 |
| Color | WG | WG |
| Yield per cent | 69 |  |

EXAMPLE V

To a solution of 100 g. of ester gum in 250 g. of decahydronaphthalene, there was added during 15 minutes with vigorous agitation at 15–20° C. 25 g. of 95% H$_2$SO$_4$. The reaction mixture was vigorously agitated for about 1¼ hours at 18–20° C. The mixture was allowed to stand 15 minutes at 20° C. The decahydronaphthalene solution was then decanted from the sludge, washed with water in the usual manner, and the solvent evaporated in vacuo. A yield of about 80 g. of polymerized ester gum remained. The product had the following characteristics as compared with the original ester gum:

|  | Polymerized ester gum | Original ester gum |
|---|---|---|
| Acid number | 5 | 8 |
| Color | K | N |
| Drop melting point °C | 120 | 89 |

Instead of rosin, rosin esters may be polymerized in accordance with the method of my invention. The rosin ester so polymerized may be either a polyhydric or a monohydric ester of rosin, and may be either liquid or solid at room temperature. Thus, polyhydric alcohol esters of wood rosin such as, for example, ethylene glycol abietate, diethylene glycol abietate, triethylene glycol abietate, diglycol abietate, glycerol abietate, sorbitol abietate, mannitol abietate, erythritol abietate, pentaerythritol abietate, etc., may be polymerized by this method. Monohydric alcohol esters of wood rosin, such as, for example, alkyl abietates, as, methyl, ethyl, propyl, butyl, amyl, cetyl, lauryl, stearyl, etc., aromatic abietates, as, phenyl, benzyl, etc., and other abietates, as, abietyl, hydroabietyl, furfuryl, hydrofurfuryl, vinyl abietate, cyclohexyl abietate, etc., may, likewise, be polymerized by this method. Furthermore, the analogous esters of French gum rosin, American gum rosin, and other rosins, and of the purified rosin acids, as pimeric acid, sapinic acid, etc., may be treated by this method. Such rosin esters may be completely esterified or they may contain a small amount of unesterified rosin acid. Thus the acid number may vary from 0 to about 25.

Instead of using either rosin or a rosin ester, a mixture thereof in any proportion may be treated by the process described herein. Polymerized rosin ester may be prepared either by polymerizing rosin ester in accordance with the present invention or by polymerizing rosin in accordance with the present invention followed by esterification of the polymerized rosin to form the ester.

Among the advantages of the process of the present invention are the fact that outstanding improvement regarding melting point is obtained over gasoline and the product is superior to and of paler color than that produced with benzene. An additional advantage is that it is easier to achieve a low acid number during the short reaction period with the present process than with benzene as the solvent, which is of particular advantage where the product is used in the preparation of a lacquer or varnish employed as a coating for regenerated cellulose sheeting where the haze-free characteristics of the low acid number product capable of being produced in accordance with the process of the present invention are desirable. In addition the use of an alkylated polymethylene hydrocarbon as the solvent is advantageous because as the number and size of the alkyl groups on the cyclohexane or cyclopentane ring increases, the efficiency of the polymerization is still further increased.

It will be understood that the details and examples given hereinbefore are illustrative only, and in no way limiting on my invention as broadly described hereinbefore and claimed hereinafter.

What I claim and desire to protect by Letters Patent is:

1. A method for the polymerization of a material selected from the group consisting of rosin, rosin esters, and mixtures thereof, comprising treating said material dissolved in a fully hydrogenated normally liquid cyclic hydrocarbon with sulfuric acid having a concentration within the range of about 65% to about 102% by weight at a temperature of from about −10° C. to about 65° C.

2. The method for the polymerization of rosin which includes treating rosin dissolved in decahydronaphthalene with sulfuric acid having a concentration within the range of about 65% to about 102% by weight at a temperature of from about −10° C. to about 65° C.

3. A method for the polymerization of rosin which comprises treating the rosin dissolved in cyclohexane with sulfuric acid having a concentration within the range of about 65% to about 102% by weight at a temperature of from about −10° C. to about 65° C.

4. A method for the polymerization of rosin which includes treating the rosin dissolved in alkylated cyclohexane with sulfuric acid having a concentration within the range of about 65% to about 102% by weight at a temperature of from about −10° C to about 65° C.

5. The method for the polymerization of a material selected from the group consisting of rosin, rosin esters, and mixtures thereof, comprising treating said material in solution in a fully hydrogenated alicyclic hydrocarbon the structure of which embodies at least one saturated carbon ring having at least 5 and not more than 6 members with strong sulfuric acid at a temperature of from about −10° C. to about 65° C.

6. A method for the polymerization of rosin which includes treating the rosin dissolved in a fully hydrogenated alicyclic hydrocarbon the structure of which embodies at least one saturated carbon ring having at least 5 and not more than 6 members with strong sulfuric acid at a temperature of from about −10° C. to about 65° C.

7. A method for the polymerization of a material selected from the group consisting of rosin, rosin esters, and mixtures thereof, comprising treating said material dissolved in decahydronaphthalene with sulfuric acid having a concentration of from about 65% to about 102% by weight at a temperature of from about −10° C. to about 65° C.

8. A method for the polymerization of a material selected from the group consisting of rosin, rosin esters, and mixtures thereof, comprising treating said material dissolved in cyclohexane with sulfuric acid having a concentration of from about 65% to about 102% by weight at a temperature of from about −10° C. to about 65° C.

9. A method for the polymerization of a material selected from the group consisting of rosin, rosin esters, and mixtures thereof, comprising treating said material dissolved in alkylated cyclohexane with sulfuric acid having a concentration of from about 65% to about 102% by weight at a temperature of from about −10° C. to about 65° C.

10. A method for the polymerization of rosin which includes treating the rosin dissolved in methylcyclohexane with sulfuric acid having a concentration within the range of about 65% to about 102% by weight at a temperature of from about −10° C. to about 65° C.

11. The method for the polymerization of rosin which includes treating rosin dissolved in decahydronaphthalene with sulfuric acid having a concentration within the range of about 85% to about 100% by weight at a temperature of from about −10° C. to about 65° C.

12. The method for the polymerization of rosin which includes treating rosin dissolved in decahydronaphthalene with sulfuric acid having a concentration within the range of about 85% to about 100% by weight at a temperature of from about 10° C. to about 30° C.

ALFRED L. RUMMELSBURG.